United States Patent [19]

Yokomichi et al.

[11] Patent Number: 5,254,674
[45] Date of Patent: Oct. 19, 1993

[54] DIAMINOAZOTHIOPHENE COMPOUND AND A METHOD FOR PREPARING THE SAME

[75] Inventors: Yasunori Yokomichi, Osaka; Shinichi Tada, Ikoma; Hitoshi Nishino, Kyoto; Kenji Seki, Higashiosaka, all of Japan

[73] Assignee: Osaka Gas Company, Limited, Osaka, Japan

[21] Appl. No.: 972,528

[22] Filed: Nov. 6, 1992

[30] Foreign Application Priority Data

Nov. 7, 1991 [JP] Japan .................................. 3-291503

[51] Int. Cl.$^5$ ............................................. C09B 62/35
[52] U.S. Cl. ...................................... 534/765; 534/728
[58] Field of Search ................................. 534/728, 765

[56] References Cited

U.S. PATENT DOCUMENTS 4,952,681 8/1990 Hansen et al. ...................... 534/765

FOREIGN PATENT DOCUMENTS 60-202878 10/1985 Japan .

OTHER PUBLICATIONS

Steinkopf et al, Uber die Diazotierbarkeit von Aminothiophenen, Mar. 1926, pp. 210–222 (German) (English abstract).

Primary Examiner—Marianne M. Cintins
Assistant Examiner—John D. Peabody, III
Attorney, Agent, or Firm—Cushman, Darby & Cushman

[57] ABSTRACT

A diaminoazothiophene compound represented by the formula (I):

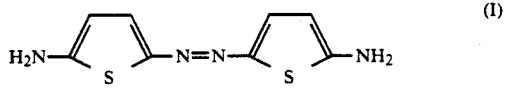

(I)

salts thereof or metal complexes thereof and a method for preparing the same.

1 Claim, 5 Drawing Sheets

DIAMINOAZOTHIOPHENE COMPOUND AND A METHOD FOR PREPARING THE SAME

FIELD OF THE INVENTION

The present invention relates to a novel azocompound and a method for preparing the compound.

BACKGROUND OF THE INVENTION

Compounds having a diaminoazothiophene structure are useful not only as an intermediate to produce agricultural chemicals, physic and dye but also as coloring material in themselves.

However, compounds having an azothiophene ring system with no substituting group are very unstable so that diaminoazothiophene compounds have not been isolated, because amino group, substituting groups and like electron-donating makes azothiophene compounds unstable. Thus, it is reported that only azothiophene compounds stabilized by electron attractive groups have been isolated.

It is an object of the invention to provide a diaminoazothiophene compound useful as an intermediate to obtain agricultural chemicals, physic and dye, and also as a coloring material, and a method for preparing the compound.

BRIEF DESCRIPTION OF THE INVENTION

SUMMARY OF THE INVENTION

Figure 1:
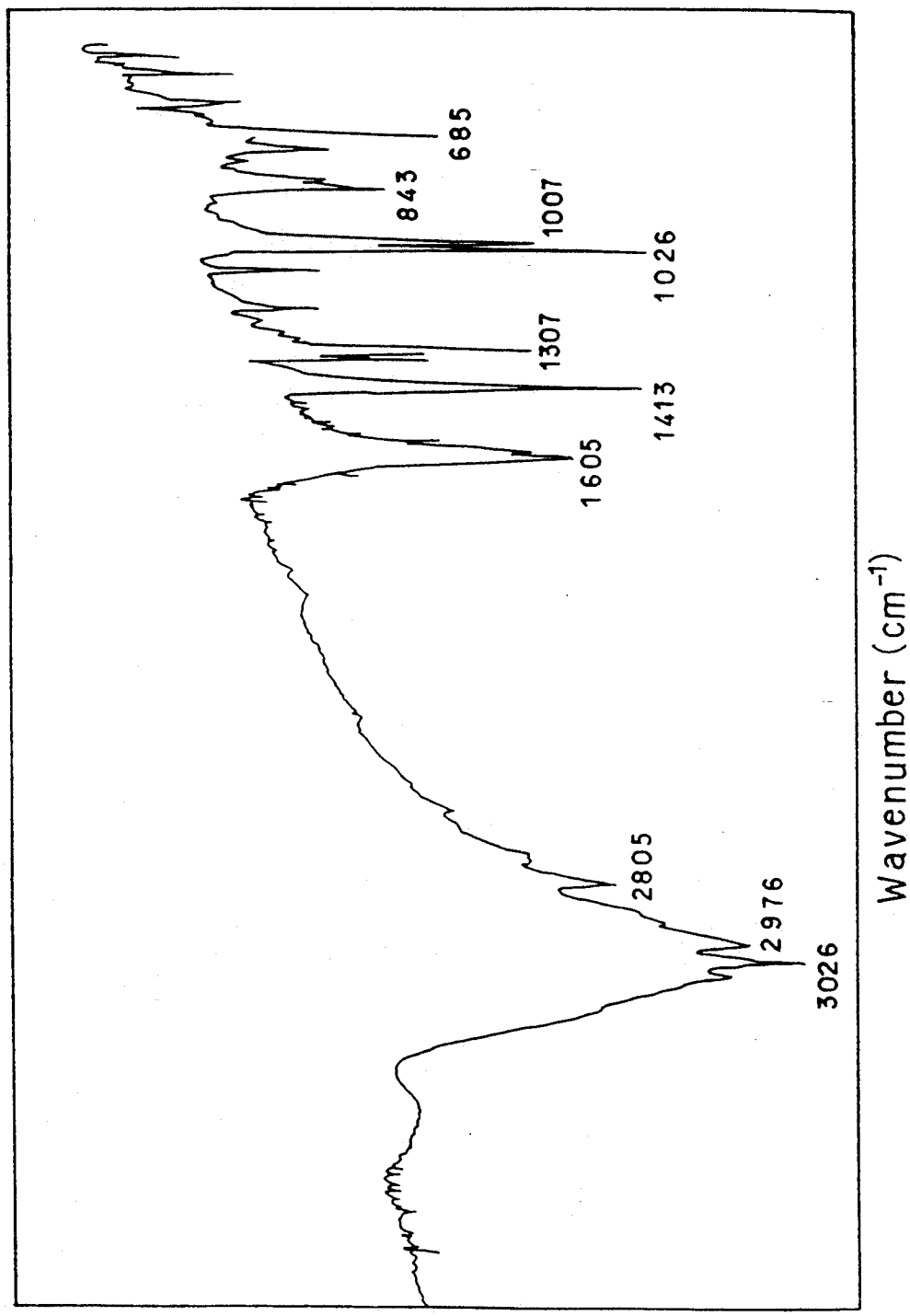
FIG. 1 shows IR spectrum of diaminoazothiophene (I) hydrochloride.

The inventors have conducted an extensive research to accomplish the objects mentioned-above, and found that a compound having a diaminoazothiophene structure can be prepared by diazotization reaction of 2-aminothiophene.

Thus, the present invention provides a diaminoazothiophene compound represented by the formula (I):

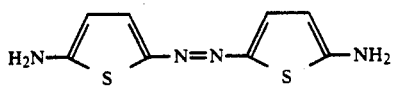

(I)

a salt thereof or a metal complex thereof.

Further, the present invention provides a method for producing a diaminoazothiophene compound represented by the formula (I):

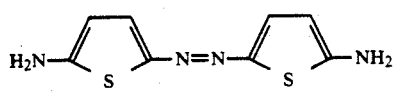

(I)

comprising reacting 2-aminothiophene, salt thereof or metal complex thereof with an excessive quantity of diazotizing agent.

Examples of salts of compound (I) are hydrochloride, sulfate, hydrobromide, perchlorate and like mineral acid salts, methanesulfonate, toluenesulfonate and like sulfonates, maleate, fumarate and like organic acid salts etc. These salts of the compound (I) can be obtained directly by the synthetic reaction of the compound (I), alternatively by isolating the compound as a free base or as a salt of one of the above-mentioned acids, followed by operating salt-formation or salt-exchange.

As metal salts of the compound (I), exemplified are zinc complex, tin complex, iron complex and the like. Formation of metal complex can be conducted by conventional methods using the free base or one of said salts of compound (I).

Synthetic route of the compound (I) is shown below as Reaction Scheme (A).

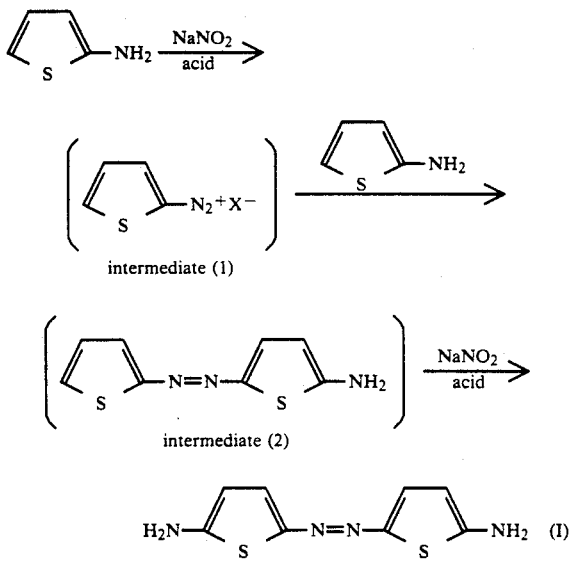

In the reaction scheme (A), X$^-$ represents F$^-$, Cl$^-$, Br$^-$, I$^-$, ½SO$_4^{2-}$, HSO$_4^-$, ClO$_4^-$, CH$_3$SO$_3^-$ or p-CH$_3$C$_6$H$_4$SO$_3^-$.

As shown in the Reaction Scheme (A), the inventors predict the reaction mechanism until reaching the present azo compound (I) as follows;

(first step) 2-aminothiophene, salt thereof or metal complex thereof is converted to diazotized intermediate (1);

(second step) intermediate (2) is formed by reacting the intermediate (1) with 2-aminothiophene; and (third step) the intermediate (2) is aminated to obtain diaminoazothiophene compound (I).

In the reaction, examples of diazotizing agents are sodium nitrite, potassium nitrite, isoamyl nitrite, ethyl nitrite, butyl nitrite, propyl nitrite and like nitrite compounds.

Addition of matal halogenide increases reaction rate, thereby preferable. As halogenated metals, zinc chloride, tin tetrachloride, titanium tetrachloride, aluminium chloride, iron chloride and the like are exemplified. The halogenated metal is added in a quantity about 2 to about 3 equivalent, preferably about 2.2 to about 2.4 equivalent based on a quantity of 2-aminothiophene.

2-aminothiophene, which is a starting material for producing the present compound, is used in a form of free base, hydrochloride, sulfate, hydrobromide and like mineral acid salts, or tin complex and like metal complex. Sodium nitrite is used about 1.5 to about 5, preferably about 1.5 to about 2.5 mole per 1 mole of 2-aminothiophene.

In the reaction of the invention, an acid is generally added. Illustrative of the suitable acids to be added are hydrochloric acid, sulfuric acid, hydrobromic acid, nitric acid and like mineral acids, and a quantity of acid added is, in case of hydrochloric acid, about 1,000 to about 1,500 ml of conc. hydrochloric acid per 1 mole of 2-aminothiophene. As a reaction solvent, water, acetic acid or a mixture thereof can be used. When sodium nitrite is used as a diazotizing agent, water is preferable as a solvent. Highly purified diaminoazothiophene (I) is obtained by cooling or salting-out the solvent after reaction.

The reaction is performed about 1.5 to about 4 hours, preferably about 2 to about 3 hours at about $-5°$ to about 6° C., preferably about 0° to about 5° C.

The diaminoazothiophene (I) obtained according to the invention is useful as an intermediate of agricultural chemicals, physic and dye.

The diaminoazothiophene (I) has $\lambda_{max}$ of 487 nm and is bright red so that the compound (I) is useful as a coloring material.

Further, a film made of a polymer obtained by polymerization of the diaminoazothiophene compound (I) has a property of performing reversible oxidation-reduction reaction, therefore diaminoazothiophene (I) of the invention is useful as a starting material the production of a conductive polymer.

EXAMPLE

The present invention is described below in detail with examples.

EXAMPLE 1

Preparation of 5, 5'-diamino-2, 2'-azothiophene (I)

4.0 g (7.6 mmol) of tin complex of 2-aminothiophene, 40 ml of water and 20 ml of 35% hydrochloric acid were added to a three-necked flask fitted with a pipe for introducing inert gas, a stirring device and a condenser, while argon gas was flowing, and the reaction mixture was stirred at room temperature until the mixture became clear. With maintaining inner temperature of the solution at about 3° C., the aqueous solution produced by dissolving 1.26 g (18.5 mmol) of sodium nitrite in 56 ml of water was added dropwise to the clear mixture for 15 minutes. After stirring the solution for 30 minutes, 1.24 g (9.0 mmol) of zinc chloride was further added to the flask, and the reaction mixture was stirred for two hours. The mixture was filtrated under reduced pressure, the filtrate was allowed to stand for 1 hour while cooling by dry-ice/methanol to form precipitate. The precipitate was separated by filtration to obtain 1.00 g of diaminoazothiophene (I) as the dihydrochloride salt. Further 0.36 g of the dihydrochloride was obtained from the mother liquor by salting out with sodium chloride. Yield was 61% based on a combined product.

The results of elemental analysis and other spectra data are shown below.

(1) Elemental Analysis molecular formula: $C_8H_{10}N_4S_2Cl_2$; Calculated (%) C:32.2; H:3.4; N:18.8; Found (%) C:31.7; H:3.4; N:20.1.

(2) $^1$H-NMR (CD$_3$OD)$\delta$(ppm): 7.52 (2H, d, H3 and H3'), 7.95 (2H, d, H4 and H4').

(3) $^{13}$C-NMR (CD$_3$OD)$\delta$(ppm): 133 (d), 149.5 (d), 154 (s), 188 (s).

(4) IR (KBr) $\nu_{max}$: 1605, 1413, 1307.

(5) UV (solvent:water) $\lambda_{max}$ (nm): 321, 489.

The data were measured with the following measuring apparatus.

$^1$H-NMR1: JNM-GX270 type (270 MHz, product of JEOL Ltd.).

$^{13}$C-NMR: JNM-GX270 type (270 MHz, product of JEOL Ltd.).

IR: 20S×C type (product of Nicolet Inc.).

UV: U-3140 (product of Hitachi Ltd.).

Figure 2:
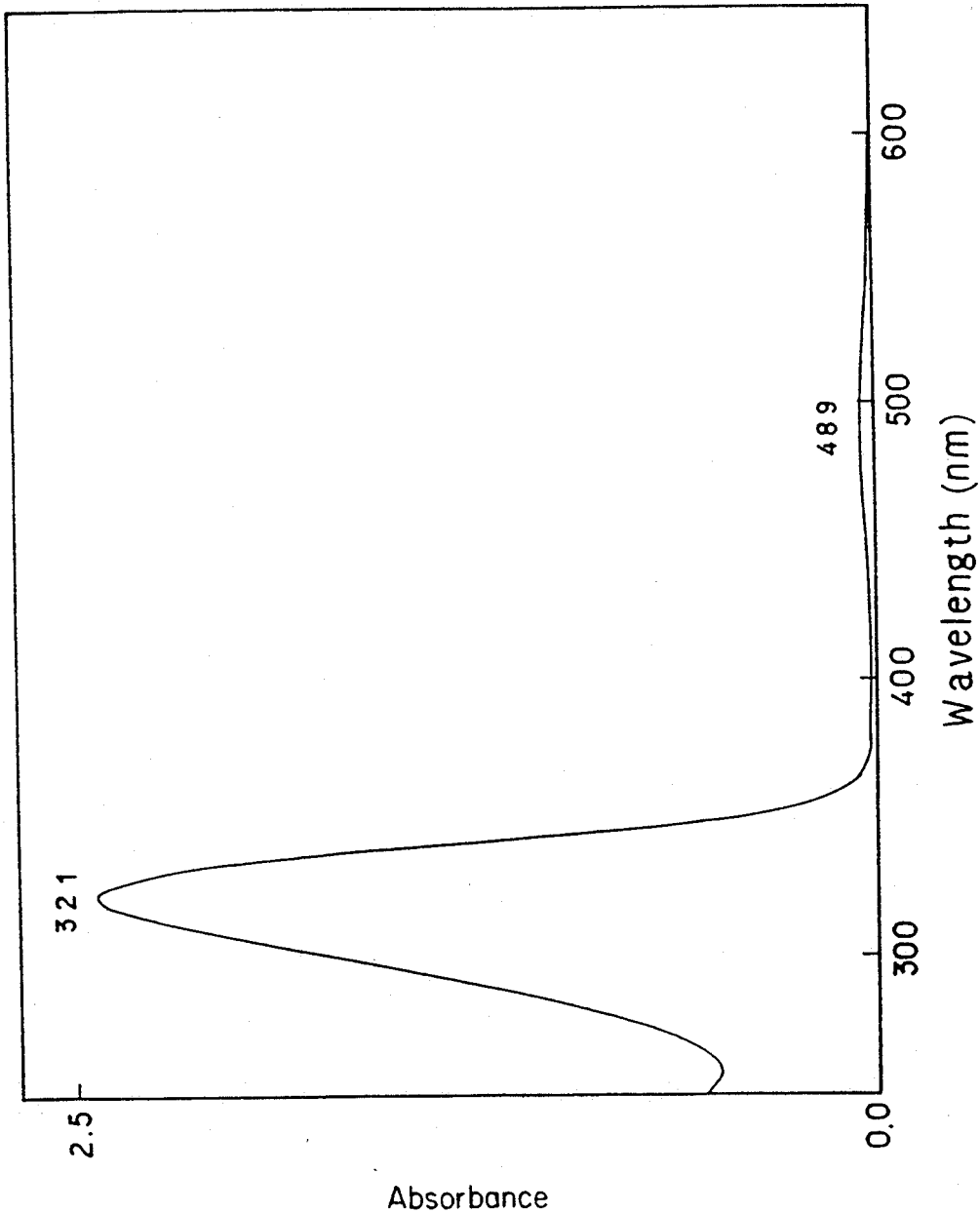
FIG. 2 shows UV spectrum of diaminoazothiophene (I) hydrochloride.
Figure 3:
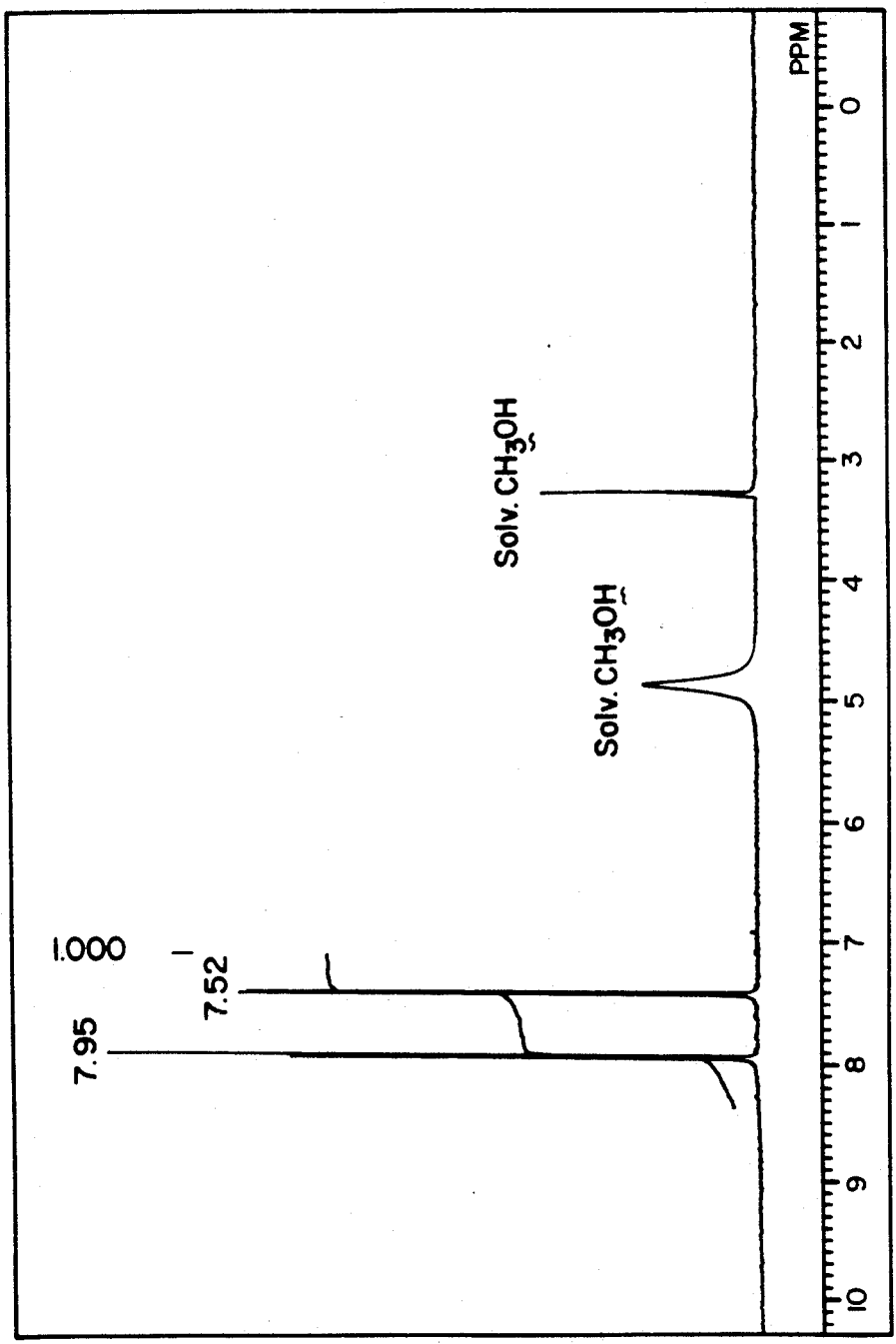
FIG. 3 shows $^1$H-NMR spectrum of diaminoazothiophene (I) hydrochloride.
Figure 4:
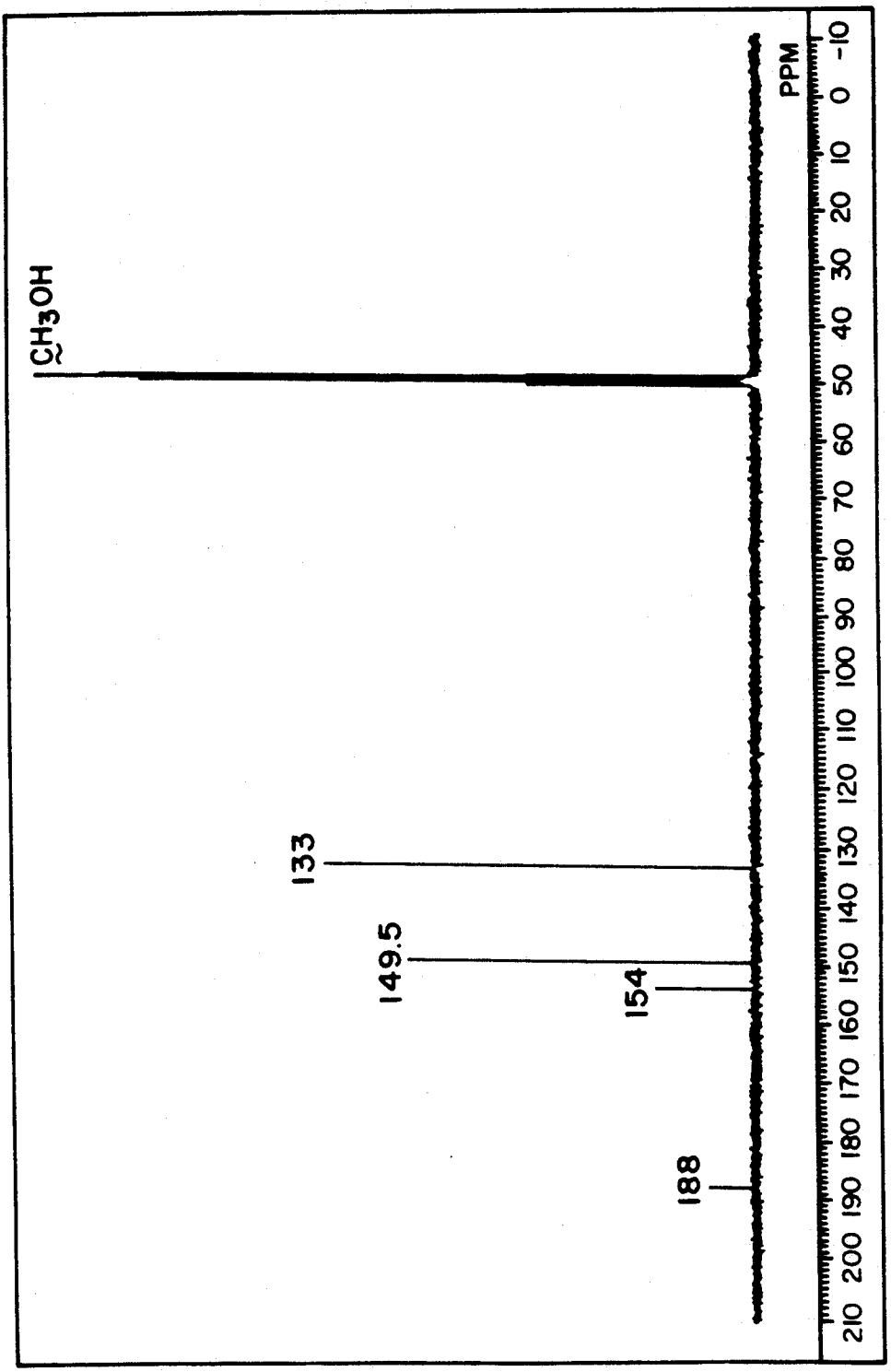
FIG. 4 shows $^{13}$C-NMR spectrum (noise decoupling) of diaminoazothiophene (I) hydrochloride.
Figure 5:
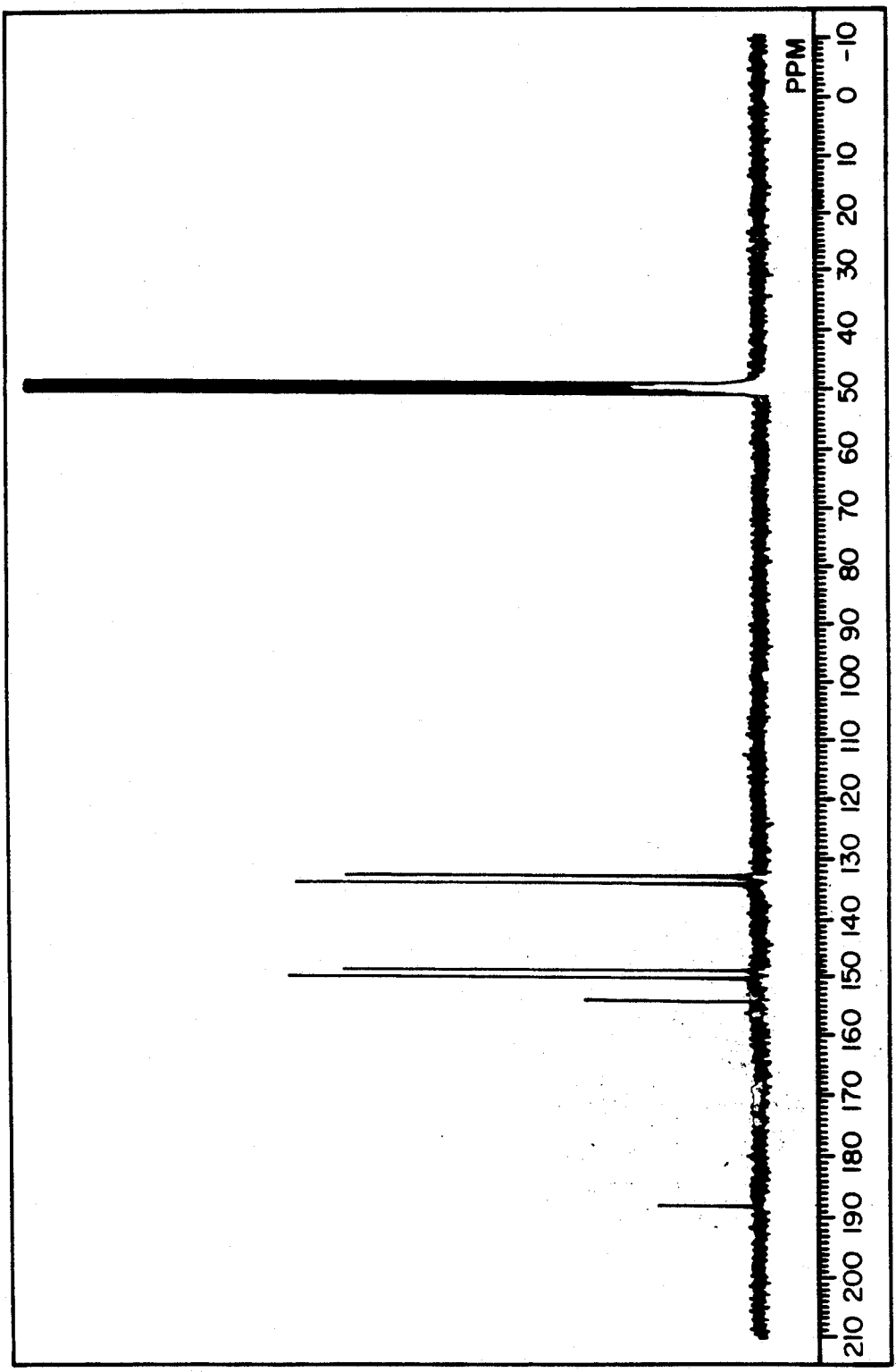
FIG. 5 shows $^{13}$C-NMR spectrum (off-resonance decoupling) of diaminoazothiophene (I) hydrochloride.

FIGS. 1 to 5 show spectra data of IR (FIG. 1), UV (FIG. 2), $^1$H-NMR (FIG. 3) and $^{13}$C-NMR (FIGS. 4 and 5) respectively.

EXAMPLE 2

The diaminoazothiophene (I) (1.63 g; yield 72%) was obtained in the same manner as in example 1 except that 2.34 g (9.0 mmol) of tin tetrachloride was added in place of zinc chloride.

The spectra data of the thus obtained diaminoazothiophene (I) were the same as in example 1.

We claim:

1. A diaminoazothiophene compound represented by the formula (I):

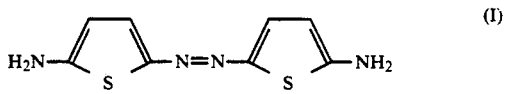

salts thereof or metal complexes thereof.

* * * * *